Oct. 31, 1961  S. A. JOHNSTON ET AL  3,007,023
TEMPERATURE CONTROL DEVICE FOR A
FREQUENCY STANDARD GENERATOR
Filed March 5, 1958  3 Sheets-Sheet 1

INVENTORS
SAMUEL A. JOHNSTON
CARL A. BERG
BY
Wheeler, Wheeler & Wheeler
ATTORNEYS Oct. 31, 1961 S. A. JOHNSTON ET AL 3,007,023
TEMPERATURE CONTROL DEVICE FOR A
FREQUENCY STANDARD GENERATOR
Filed March 5, 1958 3 Sheets-Sheet 2

INVENTORS
SAMUEL A. JOHNSTON
CARL A. BERG
BY

Wheeler, Wheeler Wheeler
ATTORNEYS

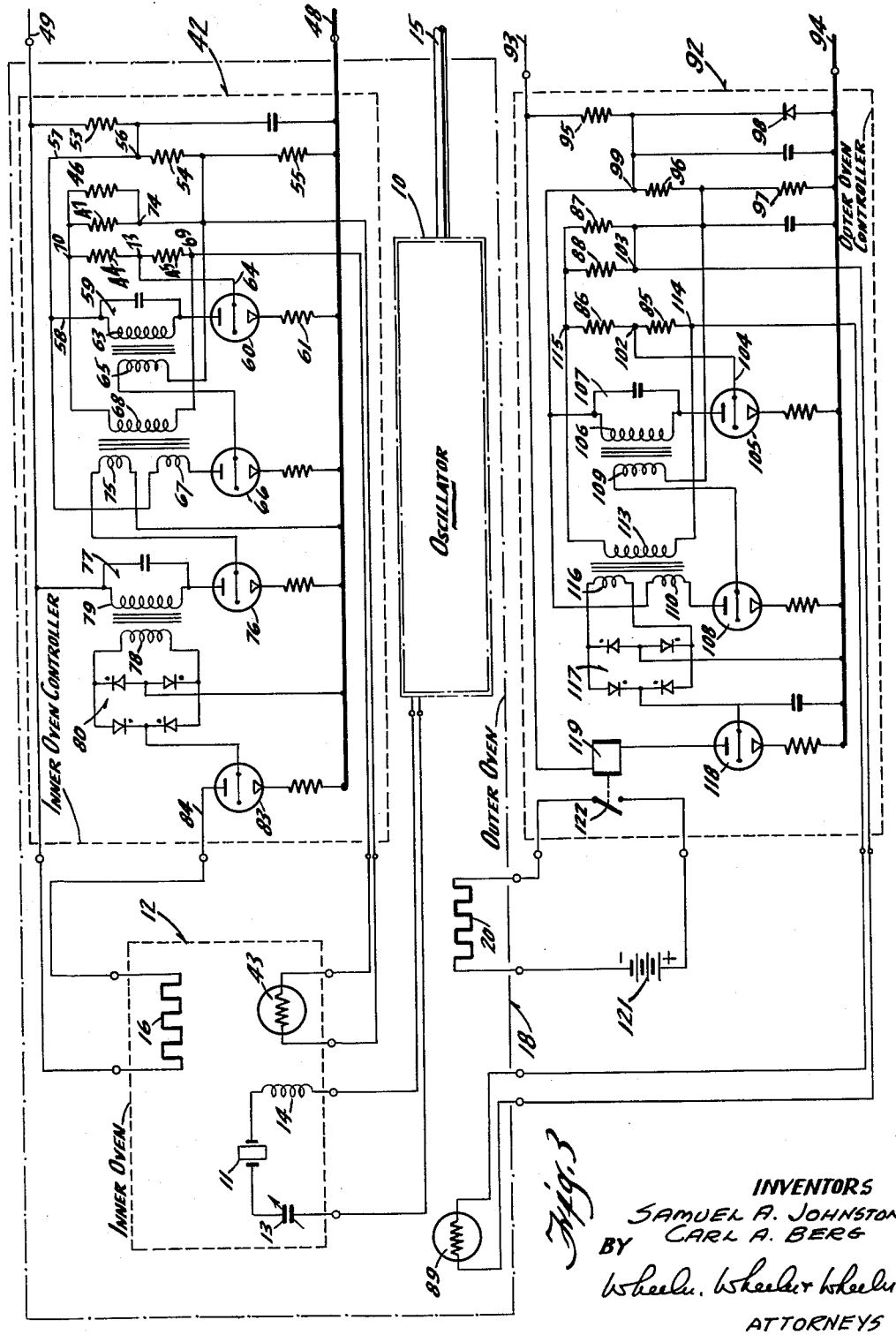

United States Patent Office 3,007,023
Patented Oct. 31, 1961

3,007,023
TEMPERATURE CONTROL DEVICE FOR A FREQUENCY STANDARD GENERATOR
Samuel A. Johnston, Fontana, and Carl A. Berg, Janesville, Wis., assignors, by mesne assignments, to Amphenol-Borg Electronics Corporation, Broadview, Ill., a corporation of Delaware
Filed Mar. 5, 1958, Ser. No. 719,369
8 Claims. (Cl. 219—19)

This invention relates to a frequency standard generator adapted to generate an electric signal accurate in frequency to within one part in one billion.

While the frequency standard generator components herein disclosed are adapted for incorporation in frequency standard generators having diverse uses, the apparatus disclosed in this application for exemplification of the invention is particularly adapted for use in the navigation of aircraft. The high speed of modern aircraft demands extreme accuracy in navigation instruments. Navigation errors resulting from a frequency drift of a few thousandths of one percent can mean an error of many miles on the ground. Accordingly, radio signals generated by appropriate electronic apparatus in the aircraft must be kept exactly on frequency in order for accurate navigation results.

Although the instant invention in its broad aspects relates to any type of frequency generator, it will be described specifically in connection with a crystal controlled oscillator. The crystal and other circuit components of a crystal controlled oscillator, as are the control components of other oscillators, are sensitive to temperature variations. Accordingly, unless the environmental temperature for the crystal and other control elements is maintained substantially constant, changes in ambient temperature would result in unacceptably wide variation in frequency output of the apparatus. In the apparatus of the present invention, the frequency of the generator will be accurate to one part in one billion under all conditions of ambient temperature ranging from $-67°$ F. to $+158°$ F. Accordingly, the aircraft can operate in sub-zero weather or at unusually elevated temperatures without affecting the accuracy of the navigation equipment. The apparatus is designed to be unaffected by barometric pressure changes in a range from 3.4 to 50 inches of mercury and humidity changes between 0 and 100 percent.

In the device of the present invention, the temperature sensitive components of the signal generator are housed within an oven which maintains these components at an exactly controlled temperature. Where the generator employs a crystal, the temperature of the oven is desirably maintained at the turning point temperature of the crystal. This temperature is ordinarily above any ambient temperature to which the apparatus may be subject.

In the preferred embodiment of the invention a double oven is used, the most critical components being disposed within an inner oven and less critical components being disposed within an outer oven which also houses the inner oven. The outer oven also contains the control circuit for the heater windings of the inner oven.

The control circuits for the heater windings of both the inner and outer ovens comprise transistor oscillators, the bias voltage to the oscillator transistor deriving from the output of a bridge including a thermistor in temperature responsive relation to the oven being controlled thereby.

Other objects, advantages and features of the invention will appear from the following disclosure in which:

FIGURE 3 is a schematic circuit diagram of the electrical circuits diagrammatically related to the inner and outer chambers of the oven.

Figure 1:
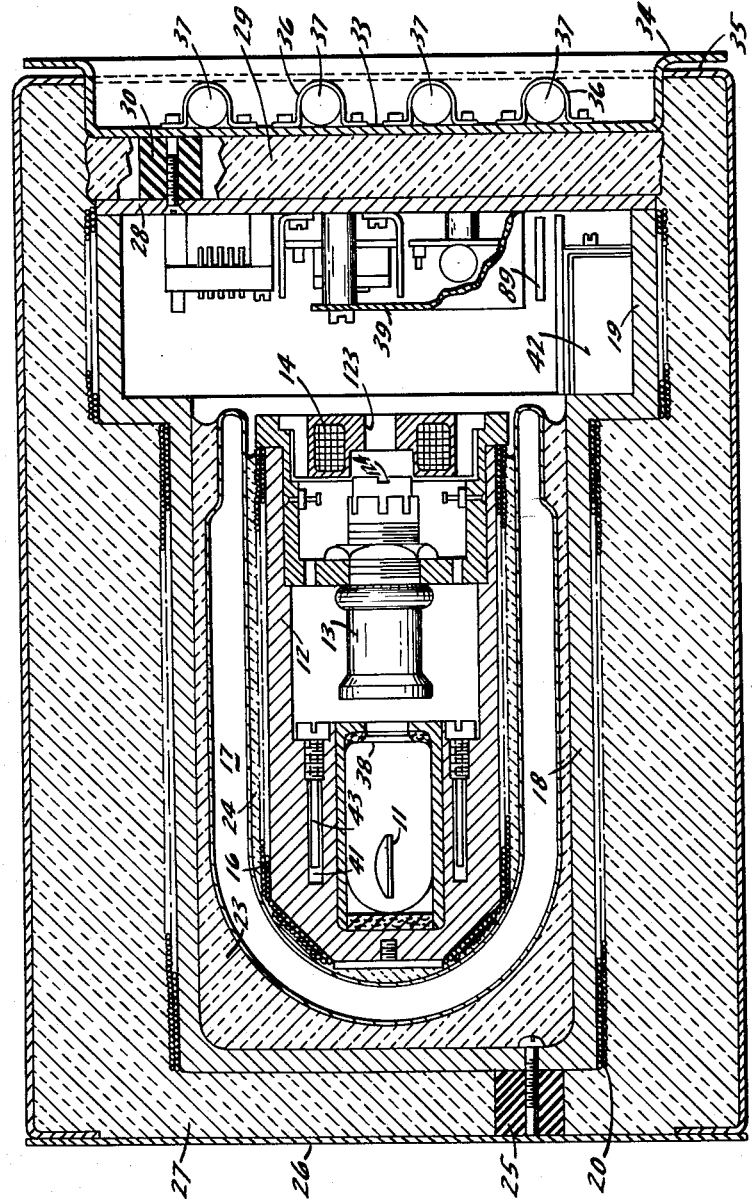
FIGURE 1 is a cross section taken through the oven structure in which the crystal and other temperature sensitive components of the apparatus are enclosed.

As is diagrammatically illustrated in FIGURE 3, there are two ovens or oven compartments and three electrical circuits with which the present invention is concerned. Fundamentally, there is a vacuum tube oscillator 10, the radio frequency signal output 15 of which is determined by the quartz crystal 11 which is housed in inner oven compartment 12. The oscillator circuit is otherwise conventional and is illustrated in the drawings only in block diagram form, except to show the variable capacitor 13 and coil 14 of the tuned circuit of the oscillator circuit which are also disposed within the inner oven 12.

The output signal of oscillator 10 may be in the frequency range of 5 megacycles and is delivered from the oscillator through the coaxial cable 15 to other apparatus not shown.

As best shown in FIGURE 1, the inner oven heat sink 12, which is desirably cylindrical in shape, is wound externally with resistance heater windings 16. Windings 16 desirably comprise two oppositely wound helical layers in which induction effects are cancelled. The inner oven cylinder 12 is disposed within a Dewar vacuum flask 17 which in turn is disposed within an outer metallic oven or compartment 18 which is generally cylindrical and has an enlarged end or head portion 19 generally square in cross section. The outer oven compartment 18, 19 is wound with inductively opposed layers of resistance heater wires 20.

Outer oven 18 is mechanically supported on case 26 on stand-off insulators 25. The spaces between the case 26, outer oven 18, Dewar flask 17, and inner oven 12 are filled with foaming silicon plastic insulation layers 23, 24, 27 which heat insulate the parts and mechanically support one part from another.

The head portion 19 of the outer oven is closed by cover plate 28 on the inner face of which certain temperature sensitive components 39 of the oscillator 10 are mounted and on the outer face of which a blanket 29 of thermal insulating material is disposed. Connected to the plate 28 on standoff insulators 30 is a heat conductive metallic outer cover plate 33 which is dished inwardly to fit within the outer oven and is provided with peripheral flanges 34 which overlap the rim flange 35 of the case 26. The closure plate 33 is provided with metallic spring clips 36 in which the vacuum tubes 37 of the oscillator circuit are clamped externally of the oven in good heat dissipating relationship to the metal plate 33.

Quartz crystal 11 is mounted within inner oven 12 in crystal holder 38 and is connected in circuit with the variable piston type capacitor 13 and coil 14, which also are disposed in the inner oven 12 and are connected by means of a coaxial cable or the like with the temperature sensitive components 39 of the oscillator 10 which are mounted on the inner face of plate 28 within the head portion 19 of the outer oven, only the vacuum tubes 37 for the oscillator being disposed externally of the outer oven.

Also within the head portion 19 of the outer oven are disposed all of the components of the inner oven controller 42, except for the control thermistor 43 which is within the inner oven and desirably embedded in a socket 41 in the wall of the inner oven 12 in close proximity to the crystal holder 38. Accordingly, the thermistor 43 is subject to substantially the same conditions of temperature as the crystal 11, capacitor 13 and coil 14, all of which are likewise disposed within the inner oven.

Figure 4:
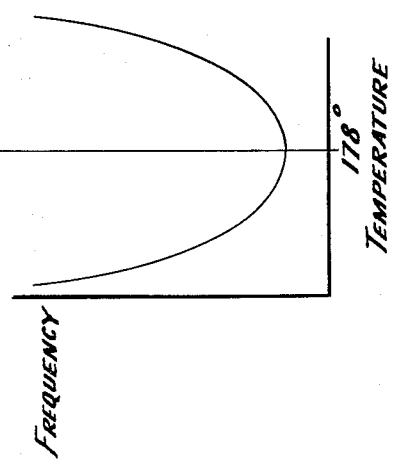
FIGURE 4 is a graph illustrating the turning point of the crystal.

The circuit for the inner oven controller 42 is shown near the top of FIGURE 3 of the drawing. The controller 42 is set to maintain an inner oven temperature which corresponds to the turning point temperature of the crystal 11. The turning point temperature must be determined for each crystal and is the temperature at which the crystal is least sensitive to temperature changes. FIGURE 4 is a graph diagrammatically relating the frequency of oscillation of a typical quartz crystal against the temperature to which the crystal is subject. For the particular crystal shown in the graph, the curve is substantially flat at a temperature of 178° F. That is, the frequency of oscillation of the crystal will be substantially unchanged at slight increases and decreases from the turning point temperature. Accordingly, at this temperature, the frequency of oscillation of the crystal is most stable and the inner oven temperature controller 42 is set to maintain the temperature of the inner oven at the relatively stable turning point temperature of the crystal, in the above example at 178° F.

Thermistor 43 comprises one leg of a resistance bridge which also includes resistance legs 44, 45 and 46. Resistor 46 is desirably in parallel with the trimming resistor 47 by which the balance of the bridge may be changed to adjust the controller to operate at a different turning point temperature.

As is well known in the art, thermistors are resistance elements which have a negative temperature co-efficient. That is, the resistance of a thermistor will decrease as the temperature increases. The resistance of thermistor 43 used in the apparatus of the present invention will change by about 4 percent for each degree centigrade change in temperature.

Inner oven controller 42 is supplied with a fixed direct current voltage applied to lines 48, 49. In the instant example, the applied voltage may be 26 volts D.C. This voltage is applied across the series connected resistors 53, 54, 55. The applied voltage at terminal point 56 is applied through lines 57, 58 through the tuned capacitive inductive circuit 59 to the output element (collector) of oscillator transistor 60. The emitter of transistor 60 is connected through resistor 61 to line 48.

Although broadly any suitable electron valves can be used in the oscillator and amplifying stage of the controller 42, transistor semi-conductors are preferred because of their compactness, heat tolerance and other inherent advantages.

Assuming that the oven is cold and is just starting up, the resistance bridge 43, 47 will be at maximum unbalance and the bias voltage applied to the grid element (base) of transistor 60 through the line 64 will be maximum, thus resulting in substantial oscillation in the tuned circuit 59. Accordingly, substantial current will flow in the coil 63 of the tuned circuit 59 and relatively high bias voltage will be induced in transformer winding 65 and applied to the base of amplifier transistor 66. Accordingly, substantial current will flow through the coil 67 in the output circuit of the amplifier transistor 66. Current flowing in coil 67 will induce a voltage in transformer coil 68 which is impressed across the input terminals 69, 70 of the bridge 43, 47. With the bridge widely unbalanced as aforesaid, there will be a substantial potential difference across the output terminals 73, 74 of the bridge, this voltage being impressed through line 64 to bias the control element of oscillator transistor 60 as aforestated.

Another transformer winding 75 adjacent coil 67 in the output of amplifier transistor 66 impresses bias voltage on a succeeding amplifier transistor 76 for oscillation of the tuned circuit 77 in the output circuit of amplifier transistor 76. Voltage induced in transformer winding 78 coupled with the coil 79 of the tuned circuit 77 is thus imposed on the bridge rectifier 80 to deliver substantial bias voltage to the amplifier transistor 83, the output of which supplies through line 84 the inner oven heating resistance windings 16.

As the temperature of the inner oven 12 rises, the thermistor bridge 43, 47 will tend to come into balance and the voltage across the bridge output terminals 73, 74 will gradually fall, thus gradually reducing the bias on oscillator transistor 60 with corresponding effect on transistors 66, 76, 83 to gradually reduce the current flowing through the heat resistor winding 16 for the inner oven 12.

When the temperature of the inner oven 12 reaches 178° F. (in the instant example), the bridge 43—47 will be in balance and the voltage across bridge output terminal 73—74 will be zero. Thereupon the transistor oscillator 60 will stop oscillating and no current will flow in the heater winding 16. Thermistor bridge 43—47 is characterized by imposition of negative bias on transistor 60 if the temperature of the inner oven rises above 178° F. Accordingly, oscillation is positively precluded until the temperature of the oven drops below the critical temperature for which the bridge 43—47 has been set. At low temperatures the unbalance of the transistor bridge will bias the oscillator transistor 60 in a direction to restore oscillation in circuit 59 and resume flow of current to the heater winding 16 to tend to restore the oven to the temperature for which the controller is set.

The inner oven control circuit above described will maintain the temperature of the inner oven 12 within 0.01° C. Power is supplied to the inner oven heater winding 16 in proportion to instantaneous requirements. When the bridge 43—47 is widely unbalanced, large currents flow in windings 16. When the bridge is nearly balanced, the current delivered to windings 16 will be very small.

Current supplied to the windings 20 on the outer oven is controlled by the outer oven controller 92 shown near the bottom of FIGURE 3. The controller is basically the same as controller 42. Thermistor bridge 85, 86, 87, 88, 89 is desirably set to maintain the outer oven at a temperature somewhat lower than the inner oven, desirably at about 158° F. As will appear, current flow through the heater windings 20 is not as finely controlled as in the case of the winding 16 for the inner oven.

Figure 2:
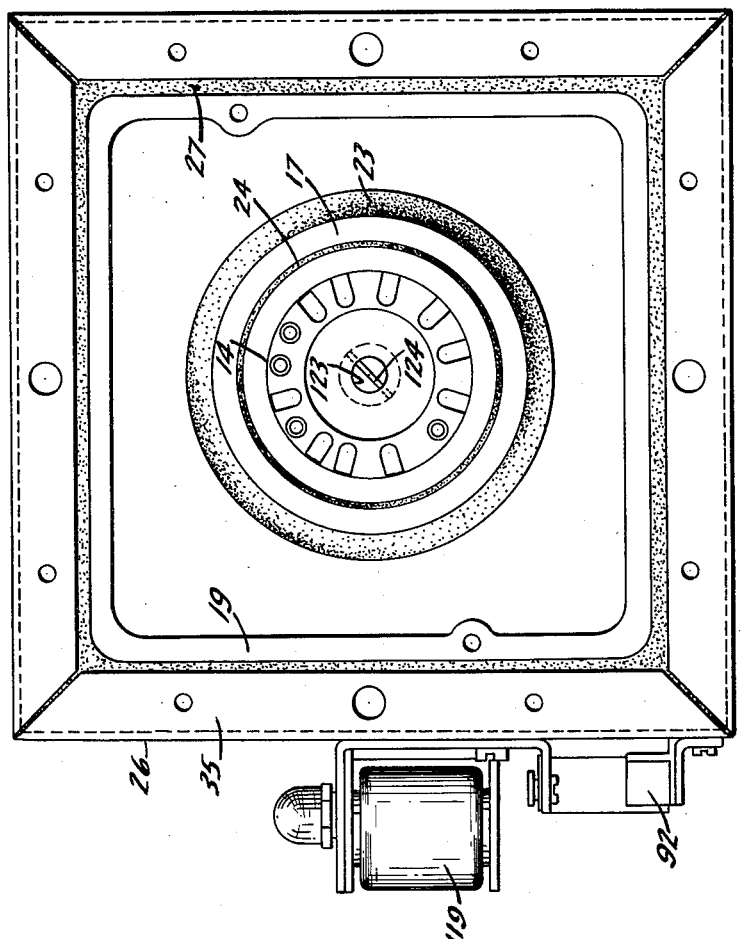
FIGURE 2 is a plan view of the oven of FIGURE 1, the cover being removed to expose the upper portion of the outer oven.

Control thermistor 89 in the bridge 85—89 is disposed in the outer oven and is accordingly, sensitive to outer oven temperature as maintained by the heater windings 20. The outer oven controller 92 may be mounted externally of the case 26, as shown in FIGURE 2. Only the thermistor 89 need be within the outer oven.

Direct current voltage, which in the instant example is 26 volts, is applied across the lines 93, 94 and is divided across the resistors 95, 96, 97. A voltage regulator 98 may optionally be connected in parallel relation with the resistors 96, 97 and a similar voltage regulator can optionally be provided in the circuit of controller 42.

The functioning of the outer oven controller 92 is quite similar to that of the inner oven 42. However, it will be described herein for completeness. Assuming the outer oven to be cold, the thermistor bridge 85—89 will be at maximum unbalance and the bias voltage applied from bridge output terminals 102, 103 through line 104 to the base of oscillator thermistor 105 will be substantial. Accordingly, tuned circuit 107 will oscillate and relatively substantial current will flow in the coil 106 of the tuned circuit. Substantial voltage will thus be induced in transformer winding 109 and relatively high bias will thus be applied to the amplifier transistor 108. Relatively high current will flow through the coil 110 in the output circuit of transistor 108. Current flowing in coil 110 will induce a voltage in the coil 113 which is impressed across the input terminals 114, 115 of the transistor bridge 85—89. With the bridge widely unbalanced, there will be a substantial voltage across the output terminals 102—103 of the bridge, this voltage being used to bias the terminal 105 through the line 104, as aforesaid.

Transformer winding 116 coupled to the coil 110 in the output circuit of the transistor 108 will impose substantial voltage on the bridge rectifier 117 to deliver substantial bias to the transistor 118, the output of which is connected to the winding of relay 119. Relay 119 controls a switch 122 in a circuit powered by source 121 to the heater windings 20 for the outer oven. Accordingly, the heater windings 20 will be intermittently energized at the fixed potential of source 121, depending upon the balance of the bridge 85—89.

I may optionally use for the outer oven controller 92 an output circuit similar to that used for the inner oven controller 42. However, inasmuch as the temperature control requirements for the outer oven are not as rigid as for the inner oven, the output circuit of controller 92 is satisfactory.

As before indicated, the foregoing structure incorporates within the outer oven the temperature sensitive components of the oscillator 10 and the inner oven controller 42. Accordingly, by maintaining the outer oven at a fixed temperature, for example 158° F., the components which control the temperature of the inner oven are isolated from changes in ambient temperature and the temperature of the inner oven can be maintained within 0.01° C.

The physical structure of the device as best shown in FIGURES 1 and 2 lends itself to compactness. The coil 14 of the oscillator 10 is mounted coaxially about a core opening 123 which gives access to the screwdriver slot 124 in the stem of the capacitor 13. Accordingly, the capacitor 13 can be adjusted for desired frequency at the turning point temperature of the crystal simply by removing the cover plates 28, 30 and adjusting capacitor 13 with a screwdriver or the like.

The inner oven controller 42 is desirably disposed at one side of the enlarged head portion 19 of the outer oven to nest with the components 39 of the oscillator 10 which are mounted on the undersurface of cover plate 28. For this purpose, the components 39 are offset toward the opposite side of the head cavity.

What is claimed is:

1. A temperature control device for a frequency standard generator having an oscillator, said device comprising an oven having an inner compartment adapted to house temperature sensitive components of the oscillator, resistance heating element for said inner oven compartment, and an outer oven compartment about said inner oven compartment and having a resistance heating element, a first control circuit for the resistance heating element of the inner oven compartment and a second control circuit for the resistance heating element of the outer oven compartment, a temperature responsive element for said first control circuit being disposed in the inner oven and a temperature sensitive element of said first control circuit being disposed within said outer oven compartment.

2. The device of claim 1 in which said first control circuit includes means for powering the resistance heating element of the inner oven compartment proportioned to instantaneous demand thereof.

3. The device of claim 1 in which said first control circuit includes means for powering the resistance heating element of the inner oven compartment proportioned to instantaneous demand thereof, said second control circuit including means for intermittently powering the resistance heating element of the other outer oven compartment from a source of substantially fixed voltage.

4. The device of claim 1 in which said first control circuit comprises a resistance bridge, one leg of said bridge comprising a thermistor which constitutes said temperature responsive element.

5. A temperature control device for a frequency standard generator having an oscillator with a control crystal having a predetermined turning point temperature, said device comprising an oven adapted to house said crystal, a heating element for said oven and a control circuit for said element comprising means to maintain said oven at the turning point temperature of the crystal.

6. The device of claim 5 in which said control circuit comprises an oscillator transistor having a control element, a resistance bridge having an output terminal connected to said control element of said oscillator transistor, one leg of said bridge comprising a thermistor disposed in heat responsive relationship to the oven in which said crystal is disposed, said bridge being adapted to supply bias voltage to the control element of said oscillator transistor when the temperature of the oven is below the turning point temperature of the crystal and will cut off bias voltage to the control element of said oscillator transistor when the temperature of the oven is at the turning point temperature of the crystal.

7. The device of claim 6 in combination with a second oven in which the oven first mentioned is disposed, said second oven having a resistance heating element, a control circuit therefor including a heat responsive element disposed in said second oven, heat sensitive components of the control circuit for the heating element of the first oven being disposed within said second oven.

8. The device of claim 7 in which the heat responsive element of the control circuit for the second oven comprises a thermistor, the control circuit last mentioned comprising an oscillator transistor having a control element, a resistance bridge including the thermistor last mentioned, said bridge having an output connection to said control element of said oscillator transistor.

References Cited in the file of this patent

UNITED STATES PATENTS

| | | |
|---|---|---|
| 1,882,989 | Schumacher | Oct. 18, 1932 |
| 1,894,687 | Hyland | Jan. 17, 1933 |
| 1,904,140 | Hentschel | Apr. 18, 1933 |
| 1,967,184 | Clapp et al. | July 17, 1934 |
| 2,149,729 | Finch | Mar. 7, 1939 |
| 2,169,307 | Tunick | Aug. 15, 1939 |
| 2,556,865 | Baldwin | June 12, 1951 |
| 2,791,706 | Font | May 7, 1957 |
| 2,858,407 | Hykes | Oct. 28, 1958 |
| 2,897,331 | McFarlane et al. | July 28, 1959 |

FOREIGN PATENTS

| | | |
|---|---|---|
| 866,391 | Germany | Feb. 9, 1953 |